United States Patent [19]

Ouimette

[11] Patent Number: 4,653,112
[45] Date of Patent: Mar. 24, 1987

[54] IMAGE DATA MANAGEMENT SYSTEM

[75] Inventor: Donald R. Ouimette, Plantsville, Conn.

[73] Assignee: University of Connecticut, Farmington, Conn.

[21] Appl. No.: 698,320

[22] Filed: Feb. 5, 1985

[51] Int. Cl.4 .............................................. G06K 9/00
[52] U.S. Cl. ..................................... 382/69; 364/130; 364/413; 364/518; 382/6; 382/41
[58] Field of Search ......................... 382/69, 6, 41, 48; 364/130, 131, 134, 147, 413, 514, 518, 521, 414; 340/798, 799, 802

[56] References Cited

U.S. PATENT DOCUMENTS

| | | | |
|---|---|---|---|
| 3,761,876 | 9/1973 | Flaherty et al. | 382/48 |
| 3,905,045 | 9/1975 | Nickel | 382/41 |
| 4,351,023 | 9/1982 | Richer | 364/134 |
| 4,516,216 | 5/1985 | Armstrong | 364/414 |
| 4,533,947 | 8/1985 | Smith | 382/6 |
| 4,545,068 | 10/1985 | Tabuta et al. | 382/41 |

Primary Examiner—Leo H. Boudreau
Assistant Examiner—Joseph Mancuso
Attorney, Agent, or Firm—Prutzman, Kalb, Chilton & Alix

[57] ABSTRACT

Digitized image data provided by plural diverse non-destructive test apparatus is organized in a common format and routed, via a high speed continuous ring-type data transmission network, to a mass data storage system for redundant storage. Stored image data retrieved from storage may be placed on the network for transmission to a display console for image recreation. Through the use of group addressing, non-image data processing devices may use the data transmission network without establishing an interactive relationship with the storage system.

20 Claims, 9 Drawing Figures

IMAGE DATA MANAGEMENT SYSTEM

BACKGROUND OF THE INVENTION

(1) Field of the Invention

The present invention relates to the collection, redundant storage and retrieval of digitized images which are produced by diverse apparatus having different data formats and particularly to the management of data produced by a plurality of different non-destructive testing modalities. More specifically, this invention is directed to apparatus for the transformation and subsequent transmission, reliable storage at a single location and selective retrieval of the results of plural, diverse test procedures and especially to an information management system for handling a large volume of digitized images such as produced by diverse types of medical diagnostic apparatus. Accordingly, the general objects of the present invention are to provide novel and improved methods and apparatus of such character.

(2) Description of the Prior Art

While not limited thereto in its utility, the present invention is particularly well-suited to use in the field of medical imaging. The radiology department of a well-equipped hospital will have a number of imaging modalities which generate digital images. These modalities include computerized tomography, ultrasound, nuclear medicine, digital subtraction angiography, digital radiography and nuclear magnetic resonance. The test apparatus, i.e., the image acquisition devices, which function in accordance with these various modalities are typically stand-alone devices. These devices are capable of generating images from digitized test data and have a comparatively small volume of local storage. These devices are also usually designed for the acquisition and subsequent analysis of a specific type of data and the images produced are optimized for a particular medical procedure. Consequently, these non-destructive testing devices generate digital images with different matrix sizes and degrees of resolution. The memory capacity required to store an image provided by one type of device may be totally inadequate to store an image provided by a different type of device and thus, if simultaneous study of the results of different tests is desired, hard copies of the image data must be provided. These different data acquisition devices cannot communicate with one another nor can they process each others data. Accordingly, at the present time archival storage is almost entirely device and manufacturer dependent, i.e., there is no common data base. This, in turn, results in inefficient storage and poor correlation of diagnostic data.

SUMMARY OF THE INVENTION

The present invention overcomes the above-discussed and other deficiencies and disadvantages of the prior art by providing a novel technique for the collection, from diverse acquisition devices, of digitized test results, the redundant storage of such test result data in a manner which is both highly reliable and minimizes the memory capacity required for such storage, and for the selective retrieval and display of stored data at a remote location or locations. The present invention also contemplates apparatus for practicing this novel technique wherein the diverse data acquisition devices are selectively coupled to a high speed continuous data transmission network. A high integrity mass data storage and archiving system is also coupled to the data transmission network. Interactive multi-moldality display consoles are additionally selectively connectible to the data transmission network whereby stored data can be retrieved and, for example, images which were digitized by the data acquisition devices may be recreated.

A particularly novel feature of the present invention resides in a bit plane data structure for digitized images which is characterized by a high degree of efficiency from the standpoint of data transmission speed, memory capacity and rate of image recreation.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENT

As noted above, while not limited thereto in its utility the present invention is particularly well-suited for use in the transformation, transmission, storage and retrieval of digital data commensurate with the images generated by diverse types of medical diagnostic devices and the recreation of the original images from the retrieved data. Such devices presently generate, for local storage and often also for processing and/or manipulation, digital data commensurate with images produced during a diagnostic procedure. These digitized images have matrix sizes which, depending on the particular modality, vary from 64×64 to 2048×2048 pixels by 6 to 12 bits of resolution. This broad range of matrix sizes corresponds to memory capacities of 4 kilobytes to 4 megabytes. The digital images from different diagnostic devices also have different data bases, i.e., the various image generation systems operate under the control of different internal software, because the host computers have different operating systems, and thus the imaging modalities are incapable of communication with one another. A unified facility information management system for medical diagnostic data, and also for other large volume image data systems, must provide for communication between a mass data storage system, display consoles and the diverse data acquisition devices.

Figure 1:
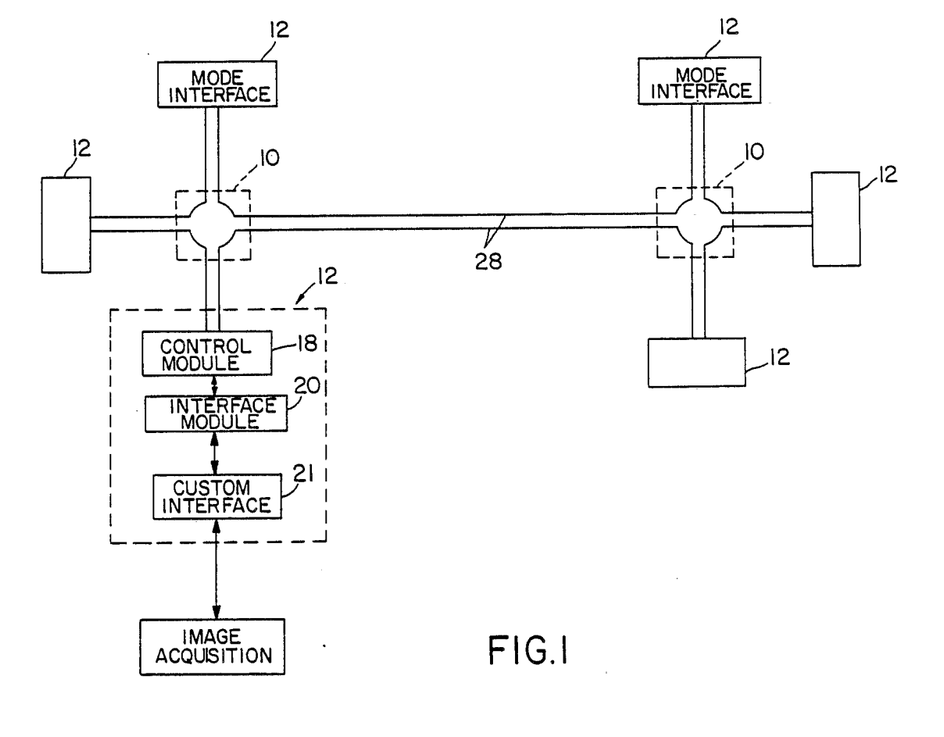
FIG. 1 is a simplified functional block diagram of a continuous ring-type data transmission network of the kind employed in the practice of the present invention.
Figure 2:
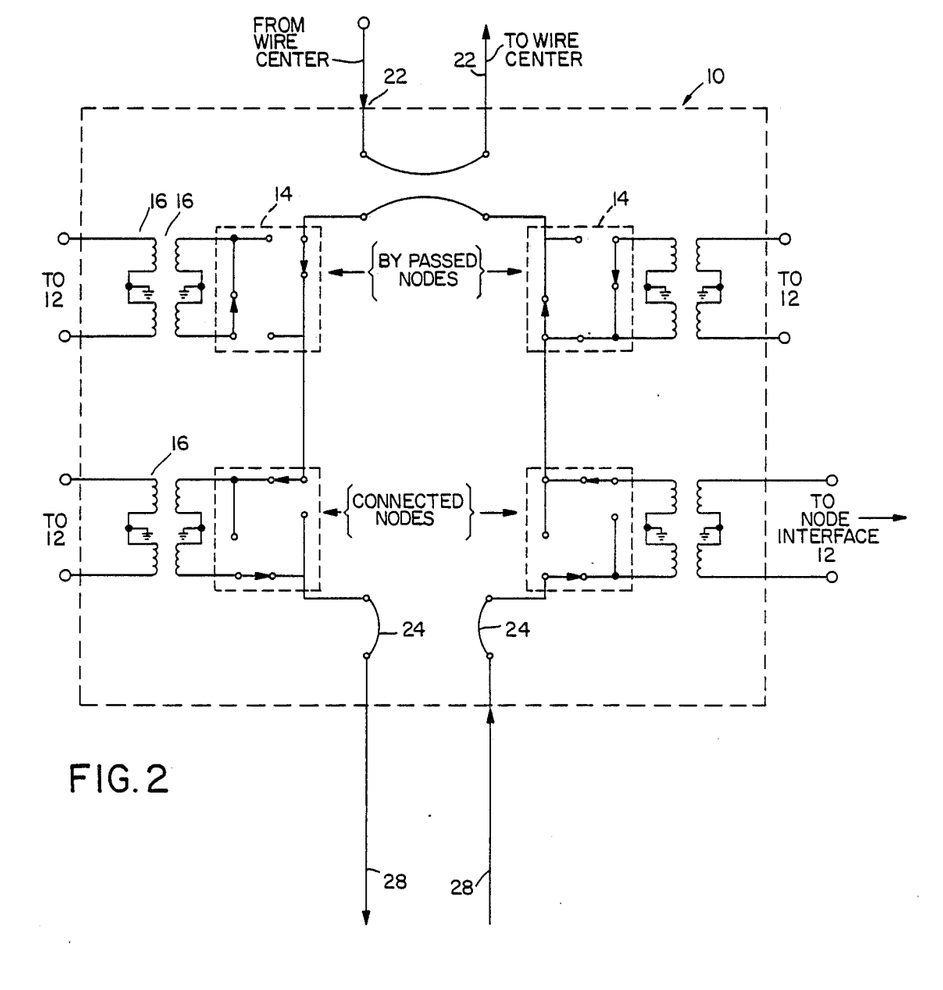
FIG. 2 is a functional representation of a portion of the network of FIG. 1, FIG. 2 in part illustrating the manner in which various data acquisition devices may be connected to the network.

Referring now to FIGS. 1 and 2, the present invention employs a ring-type architected data transmission network as depicted in simplified form in FIG. 1. While only six "nodes" are shown in FIG. 1, a ring-type network of this type can in actual practice support up to 255 "nodes". As used herein the term "node" means a data input/output point. The data transmission network is comprised of plural "wire centers" 10. These "wire centers" may, for example, be devices sold by Proteon Associates, Inc. of Waltham, Mass. under the product designations WC08 and WC16. Each "wire center" 10 will be a "passive" device, in that it does not require a power supply, and will include a double pole, double throw relay 14 and a pair of isolation transformers 16 for each node, i.e., for each image acquisition device or system which is to be connected to the network at the "wire center". The "wire centers" are coupled to the host computers of the image acquisition devices by node interfaces 12. The node interfaces exercise, in the manner to be described below, control over the relays within the wire centers 10 to connect the "node" to the "ring". The node interfaces 12 allow data to flow to or from an associated image acquisition device or display console and particularly to or from the host computer associated therewith.

As illustrated for the lower left node interface on FIG. 1, the node interfaces 12 each comprise a network interface and a custom interface. The network interfaces each comprise a control module 18 and an interface module 20. The interface modules 20 are programmable devices and may, for example, be Proteon Associates, Inc. Model HSBM or Model HSBQ depending on the nature of the device to be coupled to the "ring". The custom interfaces 21 comprise dedicated microprocessors. Any commercially available programmable microprocessor with sufficient memory to buffer a full image may function as the custom interface 21. An example of such a microprocessor is Omnibyte Corporation Model OB68K1A. The control modules 18 may be Proteon Associates, Inc. Model CTL. The control modules 18 perform bit-level network functions, including control of the operation of the relays 14, and the address decoding and signal modulation/demodulation functions required for receipt of data from and transmission of data to the particular transmission medium employed, i.e., twisted pairs, twinaxial cable or fiber optic cable. The interface modules 20 each include a pair of buffer memories for data packets, transmit and receive control and status registers, memory access logic and control logic. The interface modules control the operational mode of the associated control modules and provide temporary storage of data being placed on the ring and being received from the ring.

As illustrated in FIG. 2, the wire centers 10 provide, along with any connected "nodes", the requisite continuous data flow path which defines a ring network structure. The wire centers 10 are, as noted above, essentially passive devices with multiple node connections. The plugging of a complementary connector on a cable or the like extending from a node interface 12 into a connector at the wire center will establish a data flow path from the wire center through the node interface control module and back to the wire center. The relays included in the wire centers 10 may be energized by the associated node interface to connect this data flow path in the ring. Depending on the selected mode of operation, either the input or output packet buffer memory in the interface module 20 may, with its associated relay energized, be coupled via the control module 18 to the data transmission network. Accordingly, when a properly operating user node is plugged in and wishes to "join the ring" its associated relay will be energized. If the node fails, the relay "falls back" whereby the node junction will be by-passed. The individual nodes can also be manually by-passed at the wire centers for fault isolation and for maintenance thereby providing high reliablity with minimum downtime for the rest of the ring. The relays 14 may be connected to a fiber optic link with dual redundant automatic switch-over in the case of optical data transmission. In a typical installation, electrical conductors will be employed for short distance data transmission, for example from wire center to node interface, while optical data transmission via fiber optics will be used for "long", i.e., several kilometers or more, distances.

As the wire center 10 is depicted in FIG. 2, two of the six nodes are by-passed while two other nodes are connected to the ring. A fifth node is unused but could be connected by conductors 22 to another wire center, see FIG. 1, which would then form part of the ring. The sixth node is permanently connected, by means of jumper wires 24, to a twisted pair or twinaxial cable 28 for transmission of data to and from another wire center.

A ring network in accordance with the present invention is characterized by a high degree of reliability. As noted above, the wire centers themselves do not have any intrinsic power requirements and are essentially passive devices. Users will "break" into the ring simply by energizing a relay 14, there typically being a hard wired connection between the user, i.e., a node interface 12, and the associated wire center 10. Any type of failure associated with a connected node will result in the relay immediately returning to the by-pass condition.

In accordance with a preferred embodiment, all communication on the ring uses synchronous data transmission at a data rate of at least 10 Mbits per second and preferably at a rate of at least 80 Mbits per second. Access to the ring is accomplished by receipt of a "token" which is circulated around the ring. When a user, i.e., a connected node, receives the token, it can then place its data on the ring with source and destination addresses. Other connected nodes will receive the message and decode the address data. If the addresses are matched, the message is taken, otherwise it is passed on. No one node is the ring master. If the ring is momentarily broken, and the "token" lost, any node may initialize and start the token circulating.

The "token" is a control character which is circulated around the ring network. If a node has a request-to-send pending, the control module at that node will convert the next received "token" into a beginning-of-message character by changing its last bit. The conversion of the "token" into a beginning-of-message character insures the orderly queueing among nodes wishing to place messages on the ring. A "token" is placed on the ring at the end of the message, i.e., after the message has been "drained" by the transmitting node, thereby allowing nodes downstream of the last message originating node to place messages onto the ring if desired.

Figure 3:
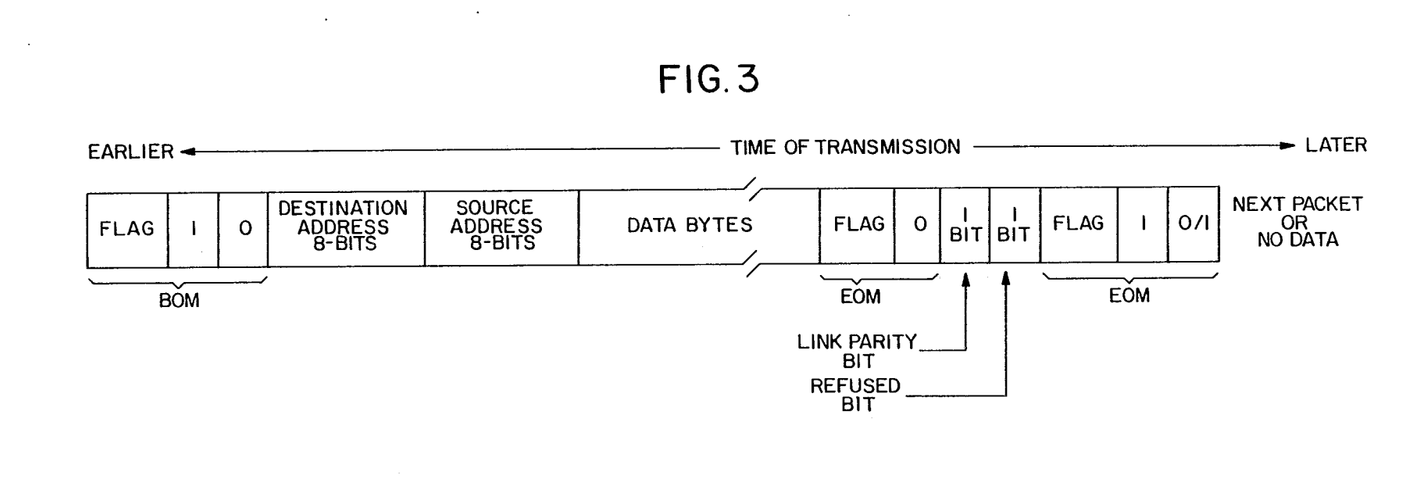
FIG. 3 is a schematic representation of the hardware level data format employed in accordance with a preferred embodiment of the invention.

The data format, as established by interface module hardware, is represented in FIG. 3. The buffers in the interface modules have a variable number of data bytes, the data field boundary being defined by the beginning-of-message and end-of-message control characters. Each message will thus comprise a control character, i.e., a "flag", bits following the "flag" which indicate the nature of the data to follow, destination and origin addresses, the actual message and an end-of-message character. The message, in one reduction to practice, is a data "packet" which includes a "header", i.e., a coded description of the size of the image and other pertinent data. The data packet will preferably comprise at least 32K bytes and will optimally comprise 256K bytes. A data packet of 32K bytes allows the transmission of an image bit plane by bit plane (see FIG. 6 and the description thereof) while a data packet of 256K bytes will accommodate an entire image for most modalities.

The node interfaces 12 are capable of operating in self-testing modes and in at least four different operational modes. In terms of function, these operating modes may be catagorized as repeat, copy, originate and initialize. In the repeat mode the data received from the adjacent upstream node is merely passed on to the next downstream node, i.e., in the repeat mode the control module in the node interface functions merely as a repeater of data on the ring. The node interfaces 12 will normally be in the copy mode. When in the copy mode, if the message received and decoded by the control module includes its own address as the destination address thus indicating that the message being received is intended for the host data processor of the data acquisition device or display console associated with that node, the received data packet will be copied, i.e., the serially received data will be transferred byte-by byte in parallel fashion into the input packet buffer memory of the interface module 20. The received data will be subsequently transferred into the memory of the custom interface module 21 where it is stored at addresses determined by the program of the dedicated microprocessor comprising the custom interface module 21. If a received message does not include the address of the control module, the node interface will function as a repeater.

When the "host" processor desires to transmit a message to another node, the control module will be switched to the originate mode in response to a command originated by the host processor. The switching of the control module to the originate mode begins the transfer of the data to be transmitted from the memory of the host processor connected to that node to the memory of the custom interface module 21. When a complete image has been transferred to the custom interface module it will be read, packet-by-packet, into the output buffer memory of the interface module 20. Upon recognition of the "token", the control module will change the "token" to a beginning-of-message character and transmit the message. When the message returns around the ring, the control module will remove it, i.e., the message will be "drained", and place a "token" back on the ring. If the ring network does not have a valid "token" control character circulating, the control module may create a "token" by initializing the ring in response to an initialize ring request from the host processor associated with any connected node. The absence of a circulating "token" is determined by a simple "timing-out" operation, i.e., if a node wishing to transmit a message does not receive a "token" within a predetermined time there is a presumption that the "token" is lost and a new "token" is created. In one embodiment of the invention, with 255 nodes connected, each node had a guaranteed access time to the ring of two milliseconds. During each access time the connected node may transmit a message, as represented in FIG. 3, including a data packet.

Figure 4:
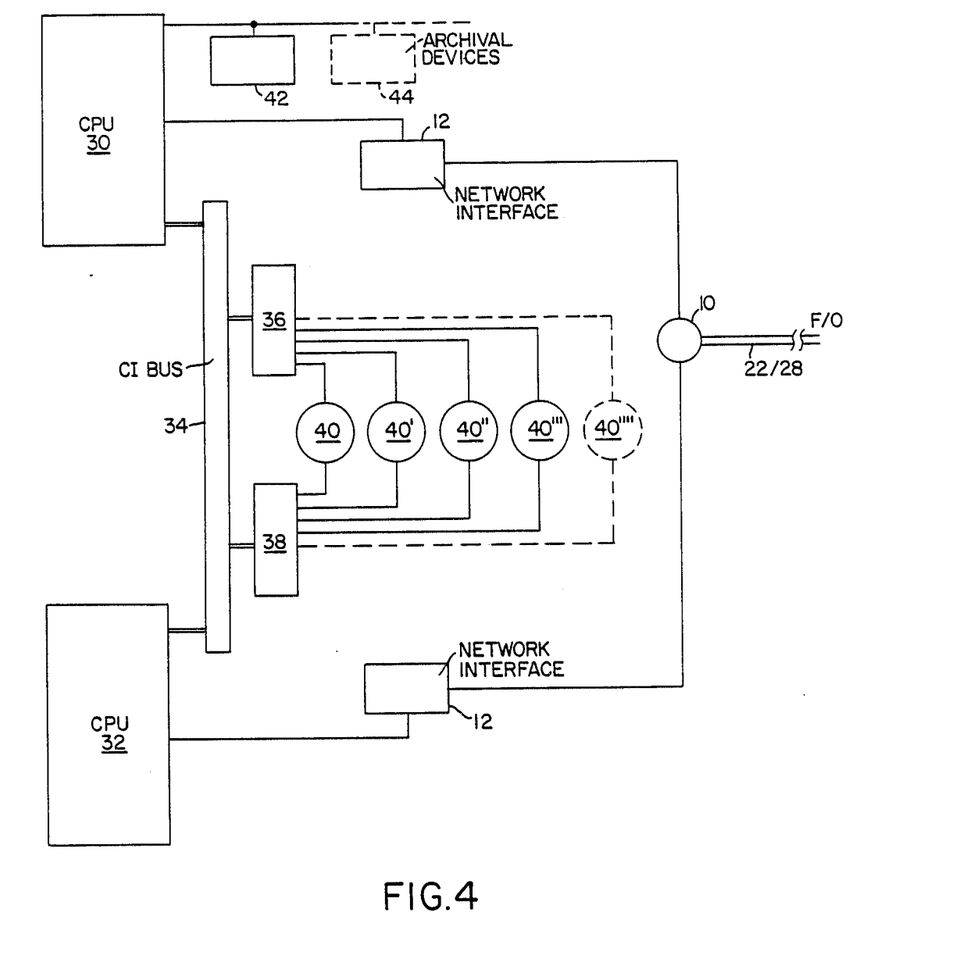
FIG. 4 is a functional block diagram of a mass data storage and archiving system particularly well-suited for use with the network of FIGS. 1 and 2 in order to practice the present invention.

Referring now to FIG. 4, a data storage and archiving system suitable for use in the practice of the present invention is depicted in functional block diagram form. The apparatus of FIG. 4 is redundantly connected, via a pair of node interfaces 12, to a wire center 10 and thus to the ring. The storage system is based upon a dual processor configuration. In such a configuration a pair of 32-bit computers, indicated at 30 and 32, are interconnected by means of a high-speed bus 34. Up to 16 devices can be connected to bus 34. Thus, additional computers or controllers can be employed in the data management system. The computer interconnect bus 34 is coupled, via a pair of identical, parallel connected mass storage controllers 36 and 38, to the actual data storage devices. In the disclosed embodiment the storage devices may be presumed to be a plurality of disk drives 40-40$^N$. The controllers 36 and 38 may, for example, be Digital Equipment Corporation type HSC50 intelligent disk/tape servers. The controllers 36 and 38 can serve all computers connected to bus 34 and thus each computer can access common data files within the mass storage sub-system. The above-mentioned HSC50 controller has six data channels, each of which supports up to four disk drives or tape formators, i.e., up to twenty-four ports are available.

The controllers 36 and 38 are dedicated mass storage servers and thus the system is highly reliable. Since the controllers 36 and 38 are programmable devices, they include self test features which allow on-line diagnostics to review critical sub-system elements and automatically remove malfunctioning devices from service. Accordingly, a malfunctioning disk drive can, for example, be taken out of the system for service or periodic maintenance without effecting the rest of the system.

The controllers 36 and 38 also have the ability to independently create a "shadow volume" data set. Volume shadowing, which is a crucial feature for a medical data base, consists of identically storing all data being loaded onto a first disk of the mass storage medium at a second location, i.e., on a second disk, thus creating a duplicate copy. The data is thus protected against device failures. Only one of the controllers 36 and 38 will normally exercise supervision over the data storage and retrieval operation and, should that controller fail, the data storage operations are immediately and automatically routed through the other controller.

The storage and archiving system may also include redundant means for storing data on and retrieving data from archival optical disks as indicated at 42 and 44. Optical data storage may, for example, be employed to removed "old" data from the hard disks in disk drives 40 for the most volumetrically efficient storage of such "old" data.

Figure 5:
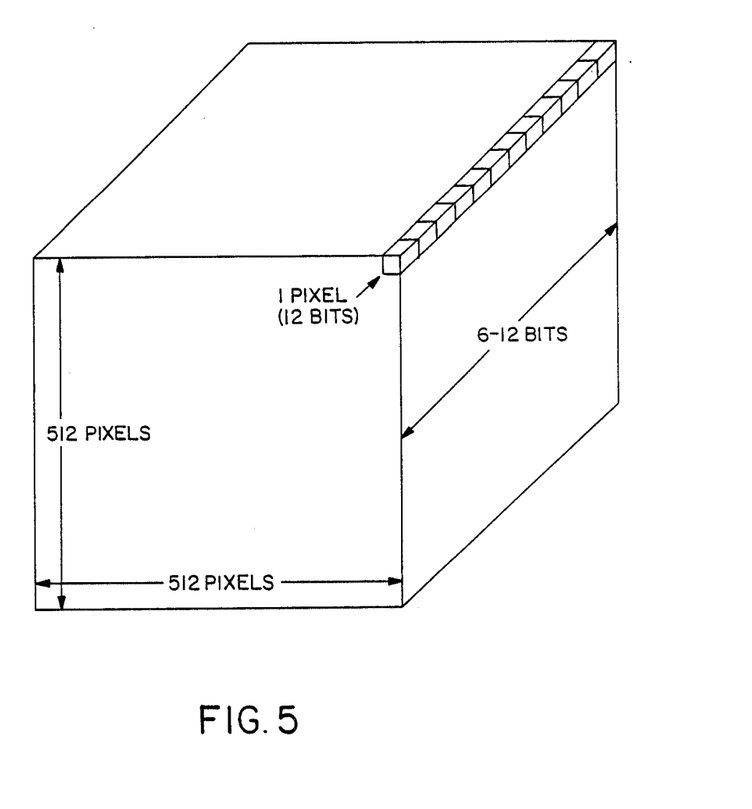
FIG. 5 is a perspective view which schematically illustrates the image data storage structure employed in the prior art.
Figure 6:
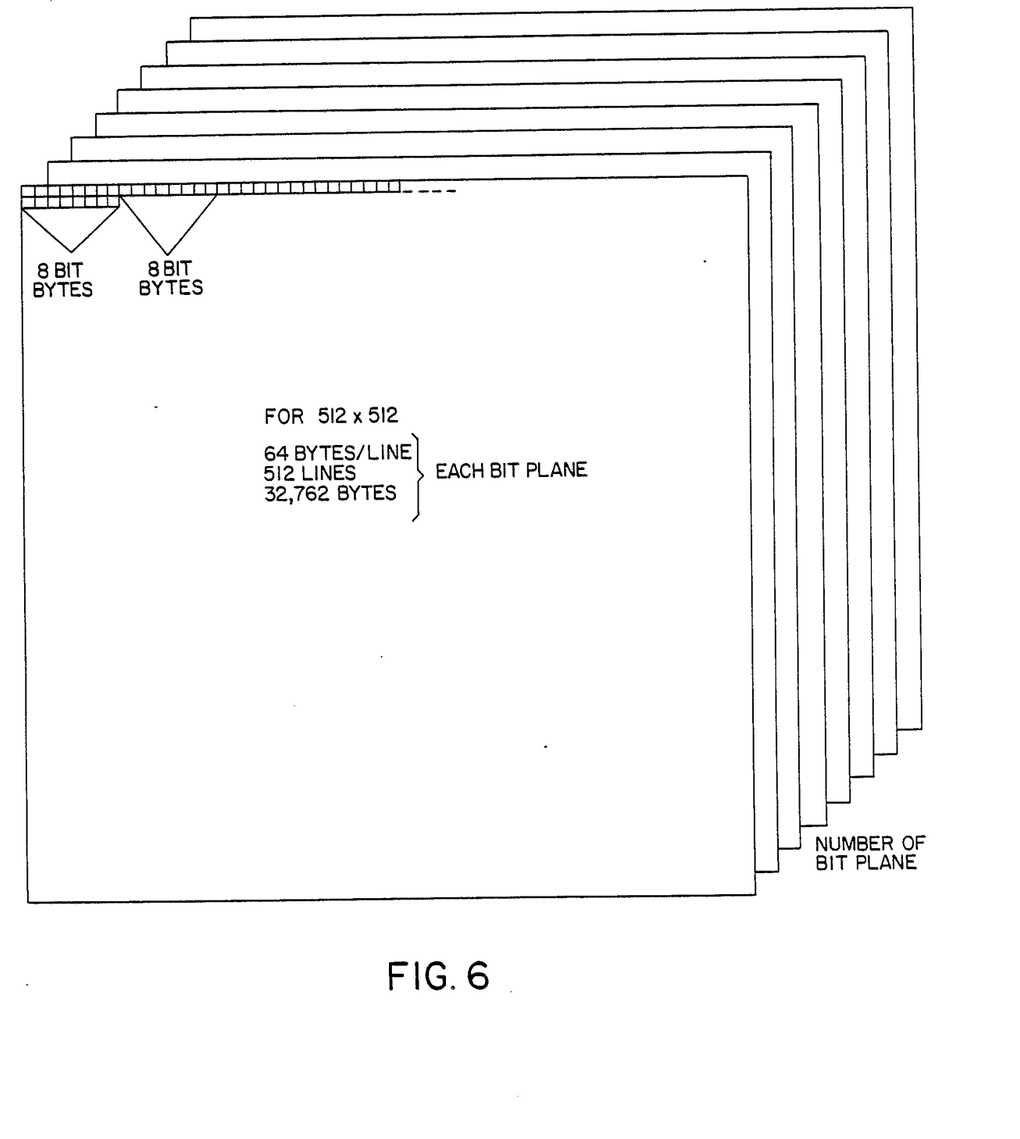
FIG. 6 is a schematic perspective view of the bit plane data storage structure of the present invention.

As noted above, data processing speed and maximum use of the available data storage capacity dictates that, even if translated to a common data base, the digitized image data be reformatted for storage. Restated, conventional data structures which are currently used for data storage are not optimized for large block image data. FIG. 5, as noted above, schematically represents the typical prior data format for a 512×512 pixel image matrix. Each pixel may be quantitized from 6 to 12 bits depending on the signal-to-noise ratio of the image. Ultrasound images, for example, typically require 6 to 8 bits of quantization. Computerized tomography images, on the other hand, may require 12 bits of quantization. Most modern computers organize data structure based upon 8 bit bytes, 16 bit words or 32 bit long words, etc. Therefore, 6 bit ultrasound images would be organized as a 512×512×8 bit block of data, i.e., 262,144 8 bit bytes, in a disk or tape file. A 12 bit computerized tomography image would be organized as a 512×512 16 bit block of data or 524,288 8 bit bytes in a disk or tape file. Both of these formats would essentially waste the remaining bits in the byte. The above-described data format is a logical organization for image data when used for image processing but, as noted, wastes storage capacity and transmission bandwidth in an overall data management and archiving system. The present invention, as will be explained by reference to FIG. 6, is based upon a bit plane data structure.

In accordance with the present invention each image is organized into bit planes with the number of planes being a function of the dynamic range of the image. Bytes are organized transversely in the bit plane as shown in FIG. 6. In a typical 512×512 pixel image this would correspond to 32,768 bytes per plane. The total amount of data needed for storage or transmission, employing the bit plane data structure of the present invention, is thus a function of the dynamic range of the image. The organization of data in a bit plane data structure is suitable for any matrix size or matrix organization, the block size of each bit plane being the same through the image depth.

In the practice of the present invention the total image block size is, as noted above, a dynamic function of the image geometry and the image dynamic range. The image geometry thus determines the bit plane block size, i.e., 256×256, 512×512, 1024×1024, 2048×2048, circular, etc. Bytes, which are the logical storage structures for conventional disk and tape mass data storage systems, are organized horizontally within the bit plane. If the image geometry is unusual, only a few bits in the last byte of each image plane may be wasted.

The present invention has the added advantage of facilitating the implementation of dynamic data compression. In the case of images produced by medical diagnostic apparatus, the actual images often have a much lower dynamic range than the level to which they are quantitized due to factors such as poor operator technique. In the practice of the present invention the number of bit planes allocated per image will be a function of the actual dynamic range of the image. The highly correlated nature of the image data can result in significantly less storage per bit plane, especially in the more significant bit planes of the image.

The highly efficient bit plane data organization of the present invention results in increased performance for data throughput on the networking system by, for example, virtually eliminating wasted bandwidth due to insignificant bits in the image data blocks. The result is more efficient utilization of the network bandwidth with faster transfer times.

A particularly significant aspect of the present invention is the improvement in interactive image responsive time. Using the bit plane data format of the present invention, the image being recalled from mass data storage will appear on the monitor at the image analysis consoles in bit planes rather than pixel by pixel or line by line. Thus, the image will be built up from the most significant bit to the least significant bit. After 4 bits, i.e., 16 grey levels, have been transferred, the viewer will see all the image his eyes can comprehend for the moment while the rest of the resolution fills in. Thus, the viewer subjectively sees his requested image in one third to one half the total image transfer time. Image integrity is also enhanced with simple parity detection at the packet level of data transfer. Any detected errors are retransmitted after the complete image has been transferred. Again, the viewer will subjectively see the requested image almost immediately. Bit errors, if any, are then replaced.

The formatting of image data into the bit plane data structure of FIG. 6 for transmission to the data storage system of FIG. 4 is controlled by the custom interface modules 21. The custom interface modules include translation buffers which can store a minimum of 256K bytes of data. Data is translated automatically in hardware by simply providing separate addressing methods for the same buffer. Data is accessed as byte data when addressed on one 256K block boundry and is accessed as bit plane data on a separate 256K block address. The data is thus buffered and translated immediately at the interfaces of the data acquisition equipment. The data is reorganized at the display consoles when the display memories are loaded. Bit planes are loaded from the most significant to least significant bits. This, of course, significantly increases the efficiency of the information management system. Archival and local storage requirements, i.e., storage at the stand-alone image collection site, are reduced. Since most image processing functions are handled locally at the analysis consoles, the information management system never needs to see the data in any format other than the bit plane data organization.

FIG. 6 is a schematic illustration of an information management system in accordance with the present invention, representative display consoles being shown in perspective in the FIGURE. The various consoles, like the computers 30 and 32 of the data storage system of FIG. 4, will be connected to the ring at a wire center or wire centers 10 via separate node interfaces 12. Through the use of the display consoles, three different forms of which are shown at 50, 52 and 54, a radiologist or scientist can analyze, compare and correlate data that was generated at any of the acquisition sites connected to the system. Each display console is a modular device. Thus, a display console can be configured as a single 512×512 pixel display console with very simple processing features, which may be suitable for an individual office, or as a powerful imaging processing station with as many as sixteen 512×512 display memories which can be configured in matrix sizes of 64×64 to 2048×2048. Larger and smaller matrix configurations are also possible and additional display memories can be added to customize the console to the application. Similarly, data processing capability of the necessary or desired type can be added to provide all of the image processing features necessary to analyze any type of image.

In the interest of maximizing the utility of the entire data management system, the performance of the interactive multi-modality display consoles must be high and particularly each display console must include hardware to implement high speed image processing algorithms. The image processing capability included in the typical display console will include the following:

(1) output function transform tables for each output;
(2) image addition, subtraction, multiplication and division;
(3) convolution - spacial filtering;
(4) shifting;
(5) magnification, i.e., zoom;
(6) rotation;
(7) roam within larger data sets;
(8) warping;
(9) multi-formatting; and
(10) graphic overlays with a hardware character generator and programmable cursor.

Figure 8:
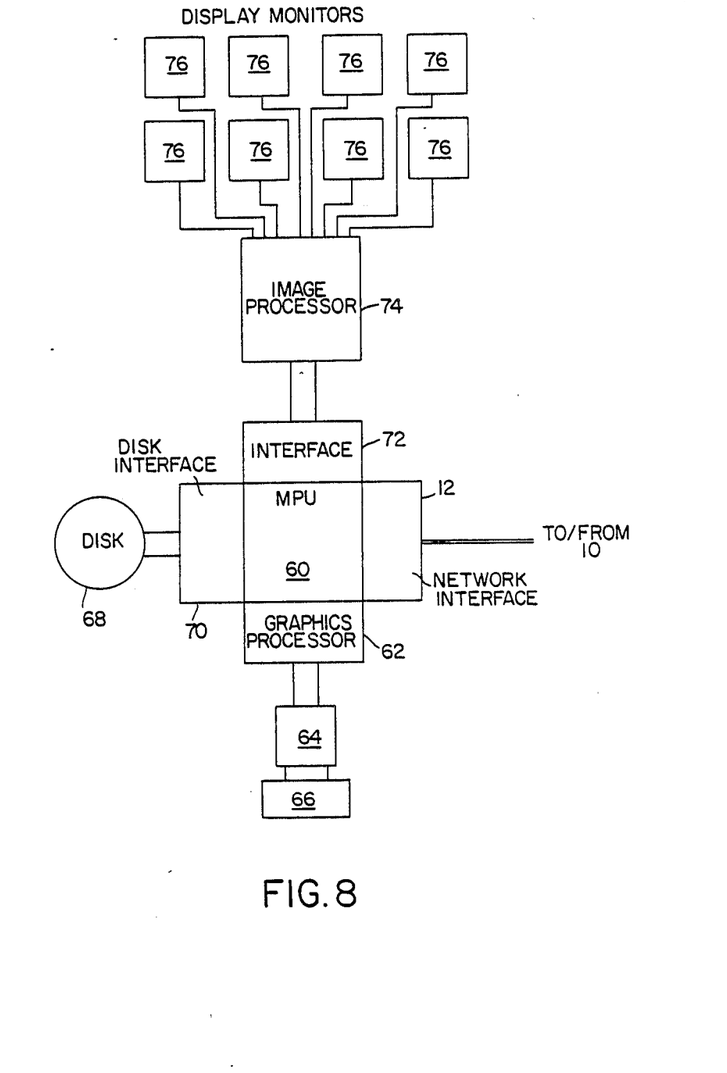
FIG. 8 is a functional block diagram of a multi-modality display consol which could be employed in the system of FIG. 7.

A display console having all of the above-listed capabilities is shown in functional block diagram form in FIG. 8. The console of FIG. 8 is suitable for display of multi-modality images and includes a node interface 12, as discussed above, which establishes communication between a general purpose microprocessor 60 and the ring. Microprocessor 60 has, either as part of its internal program or as a peripheral device, a graphics processor 62. Input commands, whereby information may be requested by the console and the image manipulated in one or more of the manners indicated above, is derived via various user interface devices indicated at 64 and 66 such as a "mouse", touch screen, keyboard, etc. Microprocessor 60 will be provided with basic disk storage, as indicated at 68, and a disk interface 70. The microprocessor 60 will be connected to an image processor 74 via an interface 72. The image processor 74 may, for example, comprise an International Imaging System Model 64. In the embodiment of FIG. 8 the console is provided with eight (8) display monitors 76 which will comprise cathode ray tubes. The console of FIG. 8 enables the radiologist to simultaneously view plural images acquired by one or plural modalities.

Figure 7:
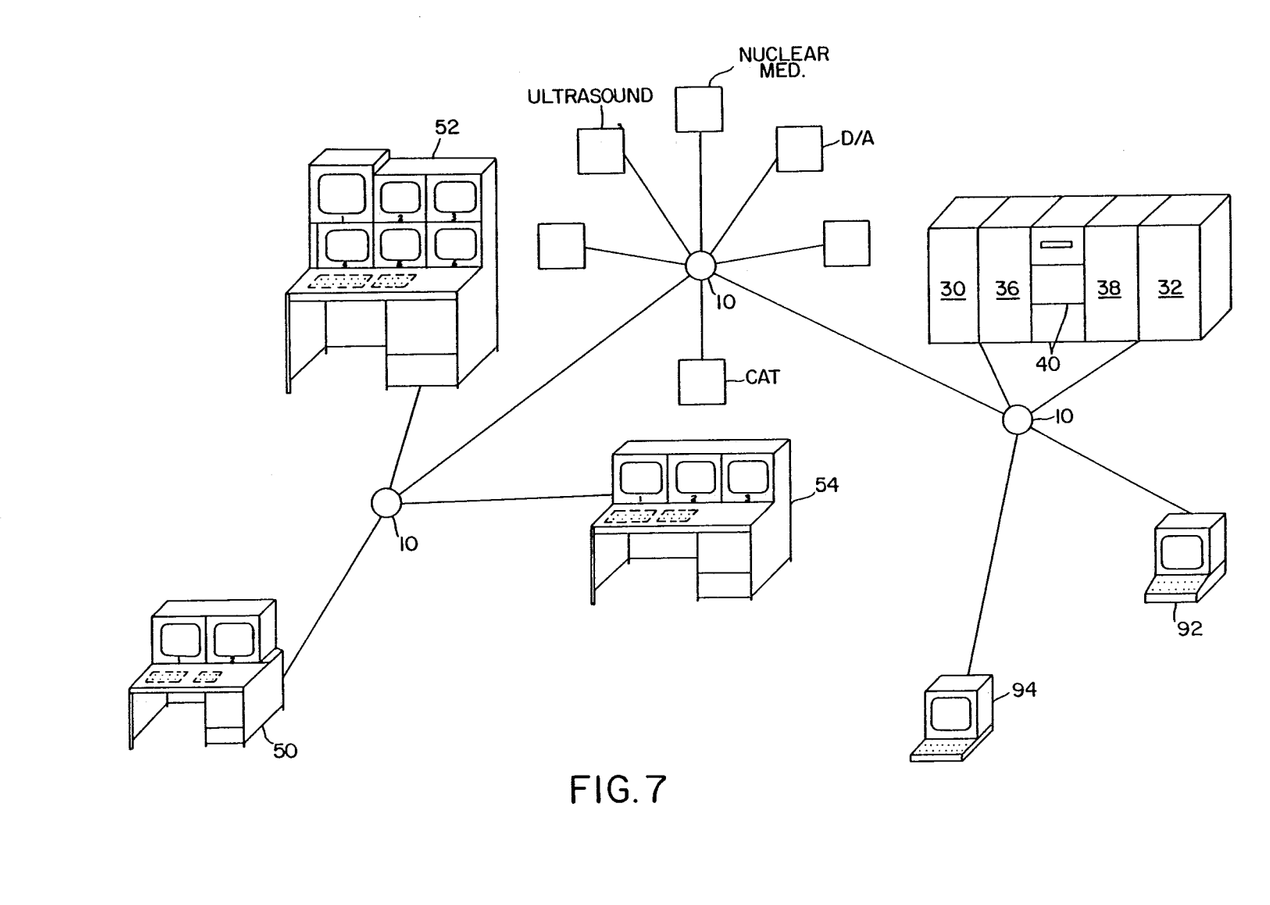
FIG. 7 is a schematic illustration of a total information management system in accordance with the present invention, FIG. 7 showing in perspective several different display consoles.
Figure 9:
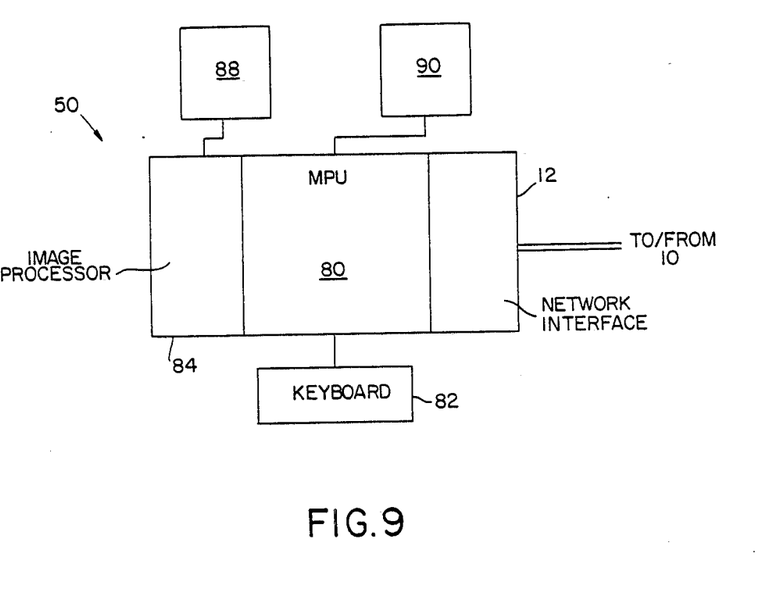
FIG. 9 is a functional block diagram of one of the display consoles of the system of FIG. 7.

The console of FIG. 9, which may in practice have the configuration of console 50 of FIG. 7, also includes a node interface 12, a microprocessor based computer 80, a keyboard 82 for the inputting of information and instructions to computer 80, an image processor 84 and an image monitor 88. The image processor 84 may be a simplified version of the image processor 74 as discussed above. The console of FIG. 9 also includes a second monitor 90 which is connected directly to computer 80 for the purpose of displaying commands, etc. entered via the keyboard 82. The inclusion of monitor 90 insures that the image to be studied on monitor 88 will not be partially obscured by or subject to the distracting influence of alphanumeric data. The console of FIG. 9 may, for example, be employed to view images in a radiologists office when complex image processing, such as permitted by the console of FIG. 8, is not required.

To summarize the above, a general purpose microprocessor based computer will serve as the host processor in each console and will control all of the display processing functions. Integral large disk storage may, as indicated at 68 on FIG. 8, be modularly added to the display console to provide local storage to increase the interactive performance. Such large disk storage may be particularly desirable in order to enable the handling of large patient files. The microprocessors in the consoles will control all the input/output functions to the integral disk storage, if present, and communication with the ring via the interface module 12.

Returning again to a consideration of FIG. 7, an information management system in accordance with the present invention will, in the environment of a radiology department, handle information and data flow in addition to the management of image data. Such additional data handling tasks include patient scheduling, room scheduling, maintenance scheduling, calendar utilities, message and mail utilities and textual data entry such as transcription services and data base records. This additional data information handling will be performed by low cost microcomputers, indicated at 92 and 94, which co-exist on the same 80 MBit/sec network as a separate community.

These additional data handling tasks, while important, are of lower priority than the handling of image data. The system of FIG. 7 separates the processing of the additional data from the handling of image data through the use of group addressing. The lower priority data will be circulated on the ring, but the microcomputers will not have an interactive relationship with the mass data storage system. The group addressing will, however, allow the microcomputers to interact, on a selective basis, with one another so that concise blocks of data, an updated schedule for example, will be available at all terminals having a need for the data. Word processors, such as microcomputer 94, may have limited access to the mass data storage so that alphanumeric data, a radiologists report for example, may be appended to stored image data.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the management of data commensurate with images, the images being acquired and digitized by plural diverse apparatus, the method comprising the steps of:

organizing the digitized image data into bit planes, the number of bit planes comprising each image being a function of the dynamic range of that image, the data comprising the most through least significant bits of the image being respectively arranged in the first through last bit planes comprising each image;

coupling each image acquisition apparatus to a data transmission network about which data may continuously circulate;

redundantly coupling a mass data storage apparatus to the network;

circulating a control character about the network;

generating and placing a message including a packet of the data comprising an organized image on the network in response to receipt of the control character, the message including a destination address and the control character; and copying and redundantly storing the data packet comprising a message if the destination address portion thereof is the address of the mass data storage apparatus.

2. The method of claim 1 further comprising the steps of:

coupling at least a first display console which includes image data storage means and image producing means to the network;

generating at the display console a message which includes the address of the mass data storage apparatus and an identification of image data stored therein which it is wished to display;

placing the message generated at the display console on the network in response to receipt of the control character;

retrieving from storage a packet of data comprising the identified image and generating a message including the retrieved data packet and the address of the first display console;

placing the message including the retrieved data packet and the address of the first display console as the destination address on the network;

copying and storing at the display console data packets comprising messages including image data retrieved from the mass data storage apparatus and the address of the display console; and creating an image at the display console from copied data packets.

3. The method of claim 2 wherein the step of generating a message comprising a packet of organized image data includes the step of:

forming the organized data into packets comprising at least a complete bit plane.

4. The method of claim 1 wherein the step of generating a message comprising a packet of organized image data includes the step of:

forming the organized data into packets which each comprise at least a complete bit plane.

5. The method of claim 1 wherein the steps of coupling each comprise:

establishing an interface between the data transmission network and the apparatus to be coupled thereto; and selectively electrically connecting an established interface in series with the network whereby all messages circulating around the network will be passed through the interface.

6. The method of claim 5 wherein each established interface has a unique address and wherein the step of establishing an interface comprises:

reading all messages circulated about the network;

returning to the network in unaltered form all messages read; and copying messages which include the address of the reading interface as the destination address.

7. The method of claim 6 wherein each generated message also includes the address of the source and wherein said method further comprises the steps of:

removing from the network at the source thereof messages which include the address of the reading interface as the source address; and returning the control character to the network after removal of a message.

8. The method of claim 7 further comprising the steps of:

coupling at least a first display console which includes image data storage means and image producing means to the network;

generating at the display console a message which includes the address of the mass data storage apparatus and an identification of image data stored therein which it is wished to display;

placing the message generated at the display console on the network in response to receipt of the control character;

retrieving from storage a packet of data comprising the identified image and generating a message including the retrieved data packet and the address of the first display console;

placing the message including the retrieved data packet and the address of the first display console as the destination address on the network;

copying and storing at the display console data packets comprising messages including image data retrieved from the mass data storage apparatus and address of the display console; and creating an image at the display console from copied data packets.

9. The method of claim 8 wherein the step of generating a message comprising a packet of organized image data includes the step of:

forming the organized data into packets which each comprise at least a complete bit plane.

10. The method of claim 7 wherein the step of generating a message comprising a packet of organized image data includes the step of:

forming the organized data into packets which each comprise at least a complete bit plane.

11. Apparatus for the management of data commensurate with images provided by at least first and second image acquisition devices, said image acquisition devices each including means for digitizing the data corresponding to acquired images, said apparatus comprising:

image data organization means, said organization means including first temporary storage means, said organization means being connected to said image acquisition devices and arranging the digitized image data in said first temporary storage means in bit planes, the number of bit planes comprising each image being a function of the dynamic range of the associated acquisition device, the data comprising the most through least significant bits of the image being respectively arranged in first through last bit planes;

mass data storage means, said mass data storage means comprising:

a plurality of data storage devices;

at least first and second programmable controllers for said data storage devices;

an interconnect bus, said controllers being connected to said bus; and at least first and second means for redundantly coupling said storage devices to said interconnect bus;

a continuous data transmission network, said network defining a ring which permits the circulation of data placed thereon;

means for coupling said mass data storage means controllers to said network, one of said controllers being selectively operative to exercise control over the redundant storage of image data placed on the network in plural of said data storage devices; and means for selectively coupling said data organization means to said network whereby organized image data may be placed on said network.

12. The apparatus of claim 11 further comprising:

at least a first display console, said display console including image data storage means and image producing means; and means for selectively coupling said first display console to said network.

13. The apparatus of claim 11 wherein said means for selectively coupling each comprise:
- interface means, said interface means having a unique address and being connected to one of said image data organization means, said interface means including:
  - means for generating messages to be placed on said network, said messages including source and destination addresses and a data packet comprising at least a portion of the image data in said first temporary storage means;
  - second temporary storage means;
  - means for receiving and decoding messages being circulated on said network, said receiving and decoding means retransmitting received messages and copying into said second temporary storage means data packets comprising messages which include the unique address of its said interface means as the destination address;
  - third temporary storage means;
  - controller means, said controller means causing the transfer of organized data from said first temporary storage means to said second temporary storage means and the transfer of data from said third temporary storage means to said first temporary storage means; and
  - relay means, said relay means by-passing said means for receiving and decoding messages in the de-energized state and connecting said means for receiving and decoding messages in series with said network in the energized state.

14. The apparatus of claim 13 wherein said apparatus further comprises:
- at least a first display console, said display console including image data storage means and image producing means; and
- means for selectively coupling said first display console to said network.

15. The apparatus of claim 14 further comprising:
- at least first computer means for processing non-image data, said first computer means having a unique source address; and
- means for selectively coupling said first computer means to said network whereby messages generated by said first computer means may be placed on said network, said mass data storage means controllers being programmed to isolate said data storage devices from messages which include the unique source address of said first computer means.

16. The apparatus of claim 14 further comprising:
- alphanumeric data processor means for generating messages pertaining to image data provided by at least one of said image acquistion devices, said alphanumeric data processor means having a unique source address;
- means for selectively coupling said alphanumeric data processor means to said network, said mass data storage means controllers recognizing the unique source address of said alphanumeric data processor means whereby the messages generated thereby may be stored with the image data identified in such message.

17. The apparatus of claim 13 wherein said image data organization means each comprises:
- a dedicated microprocessor.

18. The apparatus of claim 17 wherein said apparatus further comprises:
- at least a first display console, said display console including image data storage means and image producing means; and
- means for selectively coupling said first display console to said network.

19. The apparatus of claim 18 further comprising:
- alphanumeric data processor means for generating messages pertaining to image data provided by at least one of said image acquisition devices, said alphanumeric data processor means having a unique source address; and
- means for selectively coupling said alphanumeric data processing means to said network; said mass data storage means controllers recognizing the unique source address of said alphanumeric data processing means whereby the messages generated thereby may be stored with the image data identified in such message.

20. The apparatus of claim 19 further comprising:
- at least first computer means for processing non-image data, said first computer means having a unique source address; and
- means for selectively coupling said first computer means to said network whereby messages generated by said first computer means may be placed on said network, said mass data storage means controller being non-responsive to messages which include the unique source address of said first computer means.

* * * * *